Figure 1:
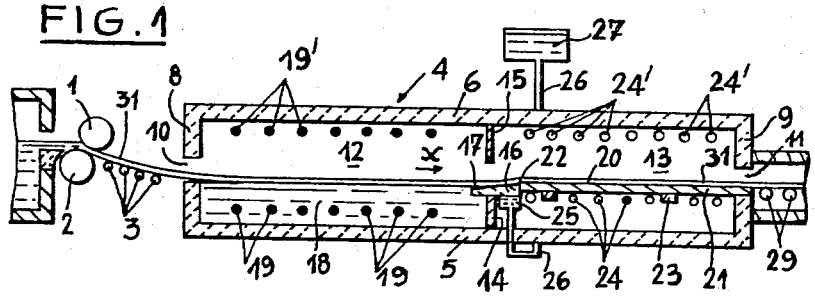

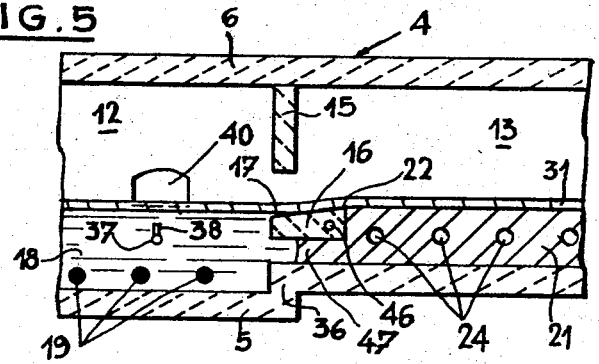
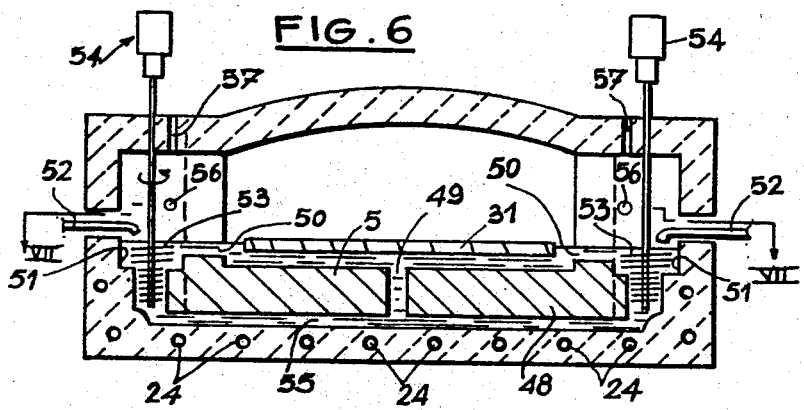
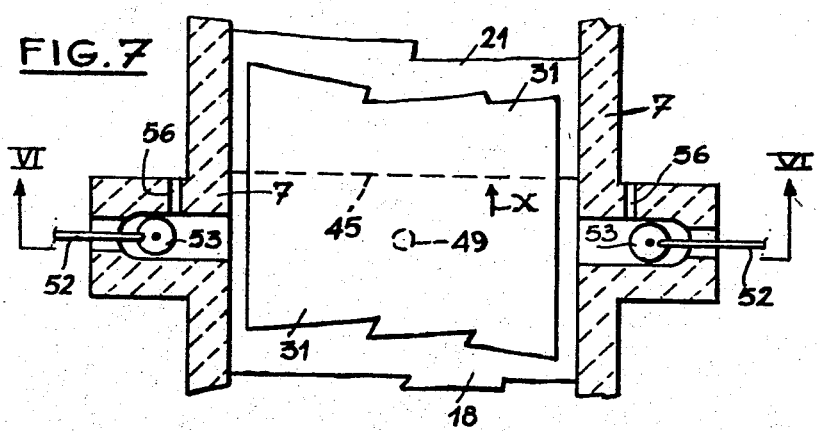

3,323,890
PROCESS AND PLANT FOR MANUFACTURING
FLAT GLASS ON A MOLTEN METAL AND
SOLID SUPPORT BED
Gustave Javaux, Saint Gilles, Belgium, assignor to
Glaverbel, Brussels, Belgium
Filed Oct. 15, 1963, Ser. No. 319,631
Claims priority, application Luxembourg, Oct. 16, 1962,
42,542
13 Claims. (Cl. 65—65)

This invention relates to a process for manufacturing flat glass in which a pre-formed continuous glass ribbon is slid over a bath of material which is non-oxidizable in air at the operating temperatures and yet is at a temperature high enough to give the glass ribbon a fire polish.

It is known to produce sheets of glass having a fire polish by sliding them over a bath of molten silver. By this method, however, it is impossible to prevent the glass ribbon from spreading out and becoming thin when an alkali-containing glass batch is used, as is most frequently the case. In fact a soda-lime glass composition remains plastic at the temperature at which silver solidifies.

It is also known to produce sheets of glass having a fire polish by sliding them over a polished sheet of metal which is preferably a good heat conductor. A liquid is interposed between the glass and the metal sheet to facilitate the sliding of the glass and to prevent the glass from sticking to the metal sheet over which it slides. The liquid, which is generally formed by salts, must withstand very high temperatures in the order of 1,000° C., particularly at the place where the glass is given a fire polish. The salts must be of low volatility at such temperature and must not corrode the glass or affect the surface structure thereof. The salts used, however, must remain liquid at a fairly low temperature i.e. between 500 and 700° C. at which the glass is solidified and can be engaged by transporter elements. Few substances completely satisfy all such requirements.

The present invention obviates the aforementioned disadvantages and allows inter alia the prevention of the spreading out of glass sheets treated on a bath of metal which is non-oxidizable in air, even when a glass containing the usual proportions of alkalies is used.

According to the invention, the continuous glass ribbon is slid on a bath of non-oxidizable metal and then slid substantially in the prolongation of the surface of such bath over the surface of a solid sole whose temperature so decreases in the direction of forward movement of the glass ribbon that the latter becomes sufficiently solidified when it leaves such sole to be engaged by mechanical transporter elements without the glass surface being marked thereby.

Preferably, a lubricating substance which is inert to the glass and the material forming the solid sole is interposed between the sole surface and the glass ribbon. The lubricant promotes the sliding of the glass over the surface of the solid sole and prevents the glass from sticking to such surface. If the lubricant contacts the glass ribbon at a place near the sole, whose mean temperature is lower than that of the bath, the possibility of the lubricant volatilizing or reacting with the glass is less than if the lubricant were interposed between the glass ribbon and the non-oxidizable metal bath as early as the place where such ribbon contacts such bath.

The invention also relates to a plant for performing the process according to the invention, said plant comprising a device for the formation of a continuous glass ribbon, a tank containing a bath of material non-oxidizable in air at the operating temperatures, means for heating such a bath to give the glass ribbon a fire polish in contact therewith and means for sliding the glass ribbon over such bath.

According to the invention, the plant further comprises a solid sole whose top surface is located substantially in the prolongation of the surface of the aforementioned bath, means for sliding the glass ribbon over the sole when the ribbon leaves the surface of the bath and means for controlling the temperature of the sole which means lowers the temperature of the ribbon sufficiently to enable the glass ribbon to be engaged by a mechanical transporter when it leaves the sole without the glass surface being marked by such transporter.

The plant allows a fairly easily meltable, for instance, soda-lime glass ribbon to be treated on a bath of metal non-oxidizable in air at the operating temperature without the glass spreading out or the surface thereof being spoiled by the oxides which would be formed on the surface of the molten metal if such metal were oxidizable.

In one particular embodiment of the plant according to the invention, the aforementioned tank forms one part of a furnace and another part thereof located beyond the tank end opposite the end thereof at which the glass ribbon forming devices are located contains the aforementioned solid sole. Preferably, the solid sole and the bath are formed by the same non-oxidizing metal and cooling means is associated with the sole to keep the sole in a solid state. Such cooling means also compensates for the heat evolved by the liquid metal and controls the decrease in the temperature of the glass ribbon sliding towards the mechanical transporter. The cooling means also allows the regeneration of the solid sole if required, since such sole can simply be allowed to melt and then be re-cooled.

In another embodiment of the plant according to the invention, a threshold is provided between the bath of molten material and the solid sole, the surface of such threshold being partly submerged in the bath and inclined so as to rise above the bath in the direction in which the glass ribbon is moving. The use of a threshold of the kind specified has a number of advantages. It is, of course, difficult to keep the surface of a liquid metal at a fixed level. The fact that the inclined top surface of the threshold is partly submerged beneath the level of the bath of non-oxidizing metal allows for variations in the level of the molten metal. Moreover, the fact that the threshold rises above such level prevents molten metal from being carried on to the solid sole by the glass ribbon, since any molten metal thus carried along flows away to the tank containing the bath. The inclined threshold therefore acts as a transition element between the bath of molten metal and the solid sole. The threshold enables small variations in the level of the metal bath to be tolerated and prevents the metal from spreading out on the solid sole and solidifying thereon.

Figure 2:
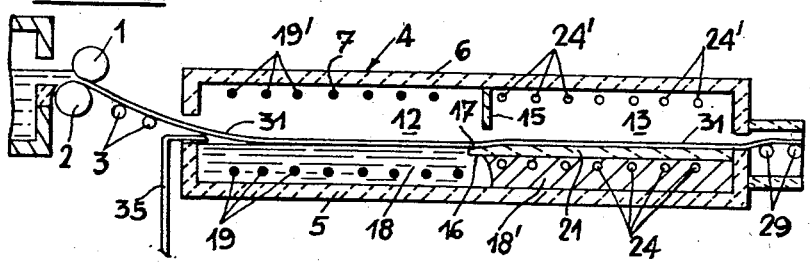
Figure 3:
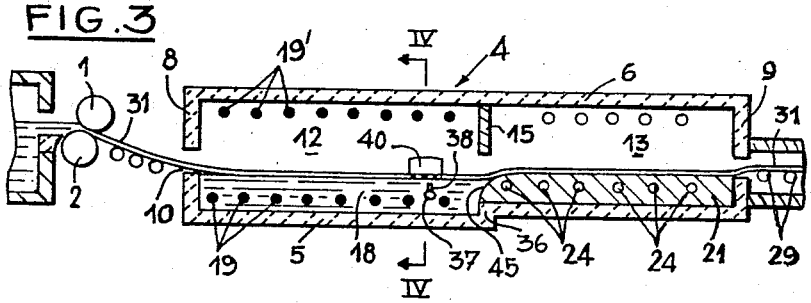
Figure 4:
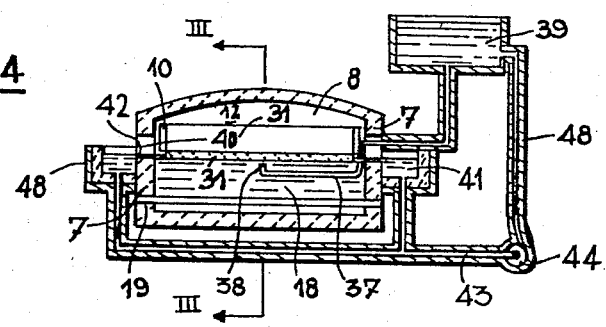

A number of illustrative embodiments of the plant according to the invention are shown diagrammatically in the accompanying drawings, wherein:

FIG. 1 is a longitudinal vertical section through a first embodiment of the plant according to the invention, FIG. 2 is a similar section to FIG. 1 through a second embodiment, FIG. 3 is a longitudinal vertical section along line III—III of FIGURE 4 through a third embodiment, FIG. 4 is a cross-section to an enlarged scale along line IV—IV of the plant as shown in FIG. 3, FIG. 5 is a longitudinal vertical section through a variant of part of the plant shown in FIG. 3, FIG. 6 is a cross-section along line VI—VI of FIGURE 7 in a fourth embodiment of the plant according to the invention, FIG. 7 is a plan view of part of the plant shown in FIG. 6, a section having been made along line VII—VII in FIG. 6.

In the drawings like references denote like elements.

Referring to FIG. 1, the plant comprises a device for forming a glass ribbon 31, the device comprising two laminating rollers 1, 2 and a set of transporter rollers 3. Downstream of device 1, 2 is disposed a furnace 4 formed by a bottom 5, a crown 6, side walls 7 and end walls 8, 9 each having a slot 10 and 11 respectively formed therein. The furnace is divided into two compartments 12, 13 separated by a barrier 14 in the lower part and a screen 15 in the top part of the furnace. All the aforementioned parts of furnace 4 are made of refractory materials.

The compartment 12 forms a tank for a bath of material 18 which is non-oxidizable in air at the temperature of the bath which must be sufficient to give a fire polish to the glass ribbon 31 which is deposited on the bath and slides thereover in the direction indicated by the arrow X.

The bath 18 can be constituted by molten salts but it is advantageously formed by a metal such as silver, which is non-oxidizing at the operating temperature. The bath is heated to the required temperature by heating means 19, for instance electric resistances. The heating means insures a temperature gradient in the bath such that the glass ribbon is gradually cooled as it slides in the direction indicated by the arrow X. Heating means 19' can be provided in the top part of compartment 12 to insure the required gradual cooling of the glass ribbon.

At the end of compartment 12 remote from the end thereof where the glass ribbon contacts the bath there is disposed a threshold or a step 16 whose top surface 17 is slightly inclined so that it is partly submerged in the bath and rises above the bath level in the direction in which the ribbon is moving.

The crest 22 of threshold 16 is at exactly the same level as the top surface 20 of a solid sole 21 located in the compartment 13 and advantageously made of non-oxidizable metal such as silver. Sole 21 is supported by means 23 secured in the side walls 7 of furnace 4. In compartment 13 there is provided cooling means comprising tubes 24 through which flows a cold fluid as for example water. The tubes 24 are disposed beneath metal sole 21. Cooling elements 24' are also disposed in the top part of compartment 13 to insure the required cooling of the ribbon therein.

The threshold 16 shown in FIG. 1, is made of a porous material, for instance steatite. Beneath threshold 16 is disposed a reservoir 25 containing a molten salt and connected by a conduit 26 to a charging reservoir 27 which pressurizes the molten salt and diffuses it in the porous threshold until the salt reaches glass ribbon 31.

The bottom surface of glass ribbon 31 is therefore covered over its whole width with a layer of liquid salt which is carried along by the ribbon between the same and the solid sole 21. The salt acts as a lubricant between the ribbon and the sole and is inert with respect to the glass of the ribbon and the material forming sole 21. The glass ribbon 31 then slides over sole 21 where the glass is gradually solidified by the indirect action of cooling tubes 24. If the bottom surface of the glass in this state is engaged by a mechanical transporter the glass will not be marked by the transporter. The excellent conductivity properties of the silver which forms sole 21 insures uniform cooling of the glass ribbon and good thermal transfer between the ribbon 21 and tubes 24. The solidified glass ribbon 31 is removed from the furnace through slot 11 by means of rollers 29 forming the first elements of a mechanical transporter which transports the glass ribbon through an annealing lehr. Rollers 29 are also effective for moving the sheet forward over bath 18 and sole 21.

In the embodiment shown in FIG. 1 the lubricant may be a salt which remains in the liquid state until it leaves compartment 13 together with the glass ribbon, or alternatively the lubricant may be a salt which solidifies before leaving such compartment. In the latter case the solidified salt forms a solid film on the bottom surface of the glass ribbon leaving the sole. The film either detaches itself from the ribbon during cooling or is easily removed by means of a solvent. In the embodiment shown in FIG. 1 the lubricant is distributed to the ribbon over the whole ribbon width through the threshold 16 at a location just before the solid sole. The lubricant also protects the threshold against oxidation when the threshold is made of an oxidizable or even combustible material such as carbon.

In the embodiment shown in FIG. 2 the lubricant is distributed over the whole ribbon width, at the location where the ribbon contacts the bath 18. It is therefore easy to see visually whether the lubricant is distributed in sufficient quantity over the whole ribbon width.

The lubricant is fed through a conduit 35 in the form of a grease charged with fine carbon powder, or with oxide powder or salt powder which does not melt at the operating temperatures, the various powders being inert to the glass, the bath 18 and the sole 21. Advantageously, the oxides used can be calcium, magnesium, zinc or aluminium oxide and the salts used can be, for instance, anhydrite, kaolin, barium and lead sulphates, talcum or steartite. These substances have the advantages of being inert and easily formed into powders. Alternatively, a liquid lubricant such as a molten salt can be used. Advantageously, the liquid salt is mixed with a powder of a material inert to the glass and the materials forming the bath and the solid sole.

In the embodiment shown in FIG. 2, the solid sole 21 is made of tungsten and the end thereof near the bath 18 has a slightly inclined surface 17 performing the same function as the top surface of threshold 16 in FIG. 1. In FIG. 2, the sole and the tungsten threshold are supported at the required level in the furnace while the silver in a molten state extends throughout the whole length of furnace 4. The part of the bath beneath sole 21 is cooled by the circulation of a cooling fluid in tubes 24 until the silver has solidified beneath sole 21. The sole 21 is retained in position because it is immobilized by the solid silver 18'.

The lubricant discharged from conduit 35 melts and decomposes in contact with the bath 18 and covers the same with a carbon film formed by the grease decomposition and the powder with which the grease was charged when it left conduit 35. Glass ribbon 31 moves forward over bath 18 and carries along the pulverulent lubricant which contacts the glass near the place where the glass is deposited on to bath 18. On arrival at the solid sole the lubricant facilitates the sliding of the ribbon thereon and protects the sole against oxidation.

FIG. 3 shows another embodiment of the plant according to the invention in which the bottom 5 of furnace 4 has a step 36 such that the depth of the bath 18 in compartment 12 is greater than the thickness of the solid sole 21 in compartment 13.

Sole 21 has the same composition as bath 18, being made of a metal such as silver, which is not oxidizable at the operating temperatures. To form sole 21, silver is first melted over the whole furnace length and then the part of the bath to the right of step 36 is cooled by the circulation of a cooling fluid in tubes 24 until the silver is solidified in compartment 13. A separating front 45 is then formed between the molten silver in compartment 12 and the solid silver in compartment 13. The front 45 has a rounded shape and can be maintained by the circulation of cooling fluid in tubes 24 adjacent the bath 18. The front 45 may, however, move slightly towards compartment 12 or compartment 13 during the operation of the plant, but the rounded shape thereof is retained. The rounded shape facilitates the rising of the glass ribbon 31 on to sole 21 when ribbon 31 emerges completely from the bath on which it was floating. The front 45 therefore acts in the same way as the inclined top surface 17 of thershold 16 in the embodiment shown in FIGS. 1 and 2.

In the silver bath 18 (FIG. 3) there is immersed a conduit 37 made of tungsten or some other material resistant to corrosion by molten silver. Conduit 37 has an outlet nozzle 38 (FIGS. 3 and 4) which discharges slightly below the surface of the silver bath. Conduit 37 is connected to a reservoir 39 containing a liquid lubricant, for instance, a molten salt mixed with powdered carbon. Side walls 7 are formed with apertures 40 through which furnace 4 communicates with troughs 41. The bottom wall 42 of apertures 40 is slightly above the level of the surface of the molten metal. The excess lubricant on the surface of the molten metal flows into troughs 41 from which it is conducted through conduits 43 by a pump 44 to reservoir 39. Apertures 40 therefore act as overflows on either side of the glass ribbon 31. The parts of the tank which are exterior of the lubricant flow are enclosed with a heat insulating layer 48.

Referring again to FIG. 3, the glass ribbon 31 slides on the surface of the silver bath. Nozzle 38 injects the lubricant which spreads out beneath glass ribbon 31 and facilitates the sliding thereof on the solid sole 21 of compartment 13.

FIG. 5 shows a variant of the embodiment of the plant shown in FIGS. 3 and 4, in which the solid silver sole 21 is separated from the silver bath 18 by a threshold 16 which is made of tungsten or other material resistant to corrosion by molten silver and has a channel 47. When the furnace is being filled, a bath of molten silver is maintained in compartments 12 and 13 which intercommunicate via channel 47. The level of the bath is raised to the height of crest 22 of threshold 16. The silver is solidified in compartment 13 by means of cooling tubes 24 and a cooling conduit 46 inside threshold 16. The silver solidifies over a portion of the length of channel 47 while the bath in compartment 12 is kept in the liquid state by means of heating elements 19. The level of the bath is then lowered to approximately the middle of threshold 16. During the lowering of the silver level, threshold 16 must not be cooled too vigorously, in order to prevent the silver from solidifying on the top of surface 17. During the operation of the plant, the liquid silver which tends to be carried over threshold 16 towards solid silver sole 21 flows away over inclined surface 17 to the bath.

In the embodiment shown in FIGS. 6 and 7, liquid silver containing a suspended powdered lubricant which is less dense than silver and formed, for instance, of carbon powder, lime, magnesia, alumina, or barium sulphate is forced across the bottom 5 of the tank in the part of the silver bath 18 adjacent the solid silver sole 21. The liquid silver is forced through a channel 49 located in the middle of the width of the glass ribbon 31. Half of the flow of silver is distributed to each of the ribbon side edges and the solid lubricant which is less dense than the silver rises in the bath until such lubricant contacts the glass ribbon which then carries the lubricant along towards solid sole 21.

The silver overflowing the edges of the glass ribbon passes through overflow apertures 50 in side walls 7 and is collected in troughs 51. Conduits 52 feed powered lubricant into troughs 51 to replace the lubricant carried away by glass ribbon 31. Vanes 53 rotated by motors 54 are used to suspend the powdered lubricant in the liquid silver. Vanes 53 force the mixture through conduits 55 and into channel 49. Heating means 24 keep furnace bottom 5 at a temperature preventing the silver from solidifying. The silver overflowing each edge of ribbon 31 is prevented from solidifying by burners 56 whose gases are evacuated through conduits 57.

Clearly, the invention is not limited exclusively to the embodiments illustrated and the shape, arrangement and constitution of the elements thereof may be modified in many ways without exceeding the scope of the present patent.

Clearly, for instance, the material forming the non-oxidizable bath 18 could be solidified at the end thereof where the glass ribbon is introduced into compartment 12, on condition that such material is molten a little further on and has a temperature sufficient to give a fire polish to the pre-formed glass ribbon.

What I claim is:

1. A process for manufacturing a continuous glass ribbon, comprising pre-forming a ribbon of glass, slidingly advancing the pre-formed ribbon on a bath of material which is non-oxidizing in air at a working temperature, heating said bath to said working temperature which is high enough to give the ribbon a fire polish, thereafter advancing said ribbon slidingly on an elongated solid member which has an upper sliding surface aligned with the upper surface of the bath to form a prolongation thereof, controlling the temperature of said solid member to decrease gradually the temperature of said solid member in the direction of advancement of the ribbon such that the ribbon is sufficiently solidified as it leaves said solid member to be engaged without the glass ribbon surface being marked, and conveying said solidified ribbon by engagement thereof with mechanical transporter elements after the ribbon has left said solid member.

2. A process as claimed in claim 1 comprising interposing a lubricant inert to the glass and to the material of the solid member, between said solid member and the glass ribbon.

3. A process as claimed in claim 2, wherein said bath is a bath of silver, and silver charged with a pulverulent lubricant of lower density than the silver is forced back into the silver bath in a zone beneath the center of the glass ribbon and the bath is allowed to overflow on each side of the ribbon into troughs from which the liquid silver is once again forced back into the bath after having been first re-charged with pulverulent lubricant.

4. A process as claimed in claim 2, wherein said lubricant is a powder.

5. A process as claimed in claim 2, wherein said lubricant is a liquid salt.

6. A process as claimed in claim 2, wherein said lubricant is a mixture of liquid salt and powder.

7. Apparatus for manufacturing a continuous glass ribbon comprising means for forming a glass ribbon, a tank containing a bath of material non-oxidizing in air at a working temperature, means for sliding the pre-formed ribbon on the upper surface of said bath, means for heating said bath to the working temperature which is sufficient to give said ribbon a fire polish as it passes on said bath, an elongated solid member adjacent said tank and having an upper surface aligned with the upper surface of said bath to form a prolongation thereof, means for sliding the ribbon on the upper surface of said solid member, means controlling the temperature of said solid member to gradually reduce the temperature thereof in the direction of advancement of the ribbon, such that said ribbon is sufficiently cooled and solidified as it leaves said solid member to be engaged without the glass ribbon surface being marked, and means for engaging and conveying said solidified ribbon after it has left said solid member.

8. Apparatus as claimed in claim 7 comprising means for interposing a lubricant inert to the glass and to the material of the solid member between said member and the glass ribbon.

9. Apparatus as claimed in claim 7, comprising means for feeding a lubricating substance beneath the glass ribbon.

10. Apparatus as claimed in claim 9, wherein said means for feeding the lubricating substance is positioned to feed said substance into the bath of molten material adjacent the solid member.

11. Apparatus as claimed in claim 9, wherein the means for feeding the lubricating substance is located above the surface of the bath of molten material adjacent the location where the glass ribbon is deposited onto said bath.

12. Apparatus as claimed in claim 9, comprising a threshold constituted of porous material in the path of said ribbon upstream of the solid member, and a closed reservoir containing a fluid lubricant located beneath said threshold, said threshold defining an upper wall for said reservoir.

13. Apparatus as claimed in claim 7, wherein said bath is a silver bath, said tank including side walls, overflow means in said side walls through which the bath of silver overflows, troughs associated with said overflow means for receiving the silver bath therefrom, said means for feeding a lubricating substance comprising means for feeding pulverulent lubricant to the silver in the troughs, means for mixing the silver and pulverulent lubricant in the troughs, and means in communication with said troughs for drawing the mixed silver and pulverulent lubricant therefrom and feeding the same to the bath in the tank midway between the said walls thereof.

References Cited

UNITED STATES PATENTS

| | | | |
|---|---|---|---|
| 2,314,325 | 3/1943 | Binkert | 65—24 X |
| 2,387,886 | 10/1945 | Devol | 65—25 |
| 2,392,770 | 1/1946 | Ryan et al. | 65—24 X |
| 3,248,197 | 4/1966 | Michalik et al. | 65—32 |

DONALL H. SYLVESTER, *Primary Examiner.*

A. D. KELLOGG, *Assistant Examiner.*